(12) United States Patent
Zhao

(10) Patent No.: US 6,888,068 B2
(45) Date of Patent: May 3, 2005

(54) METHOD FOR REMOVING A BRAIDING LAYER OF COAXIAL CABLE

(75) Inventor: Jim Zhao, Mission Viejo, CA (US)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 10/293,669

(22) Filed: Nov. 12, 2002

(65) Prior Publication Data

US 2003/0066187 A1 Apr. 10, 2003

Related U.S. Application Data

(63) Continuation of application No. 09/454,538, filed on Dec. 6, 1999, now Pat. No. 6,477,767.

(51) Int. Cl.⁷ .............................................. H02G 15/08
(52) U.S. Cl. .................................................. 174/75 C
(58) Field of Search ................................ 174/75 C, 78, 174/88 R, 88 C

(56) References Cited

U.S. PATENT DOCUMENTS

| | | | |
|---|---|---|---|
| 4,722,471 A | * | 2/1988 | Gray et al. ................. 228/265 |
| 5,293,001 A | * | 3/1994 | Gebs ............................ 174/36 |
| 6,093,886 A | * | 7/2000 | Bazizi et al. .............. 174/31 R |
| 6,326,549 B1 | * | 12/2001 | Kunii et al. ............... 174/88 C |
| 6,417,445 B1 | * | 7/2002 | Sato et al. ..................... 174/36 |
| 6,583,361 B2 | * | 6/2003 | Clouet et al. ............... 174/108 |
| 2003/0024728 A1 | * | 2/2003 | Yamamoto et al. ...... 174/113 R |

FOREIGN PATENT DOCUMENTS

JP            3-32312       * 12/1991

* cited by examiner

*Primary Examiner*—Chau N. Nguyen
(74) *Attorney, Agent, or Firm*—Wei Te Chung

(57) ABSTRACT

A method for removing a braiding layer of a coaxial cable which includes a core conductor; a layer of insulator coated over the core conductor; a layer of braiding layer encapsulated the insulator; and 4) an outer insulator, comprises the steps of a) removing a section of the outer insulator to expose a section of the braiding layer; b) dipping the section of the braiding layer into a solder bath such that the braiding layer is coated with a layer of solder to form a consolidated section; c) scoring a cut along traverse section of the consolidated section and dividing the consolidated section into first and second portions; d) bending the consolidated section along the cut to break the first and second portions; and e) removing the first portion and exposing the inner insulator.

1 Claim, 4 Drawing Sheets

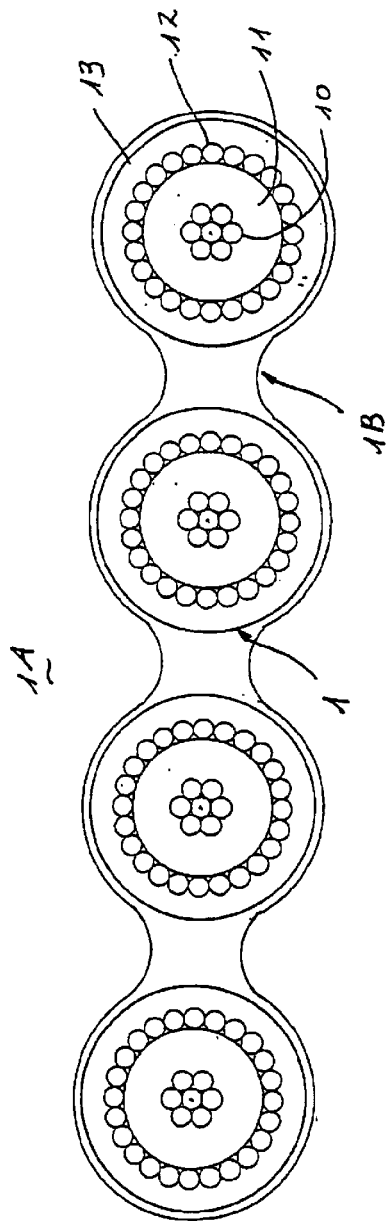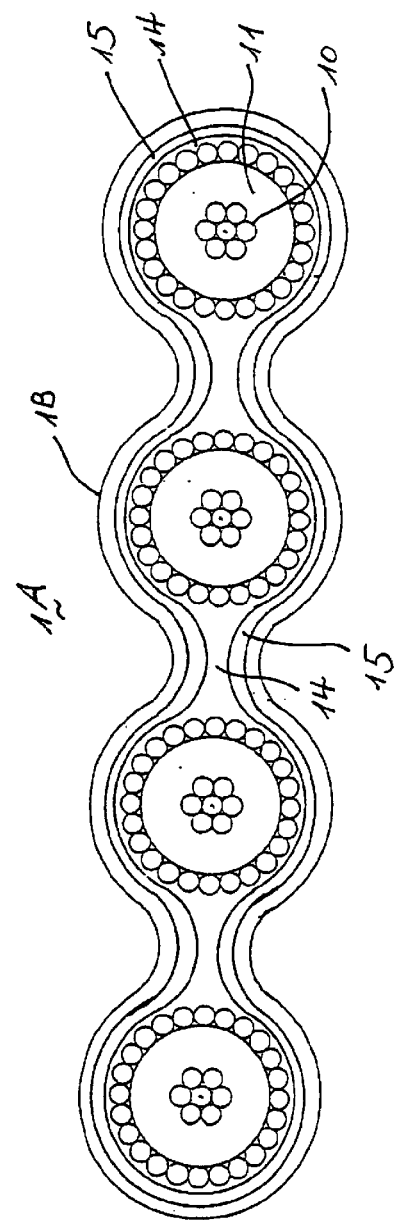

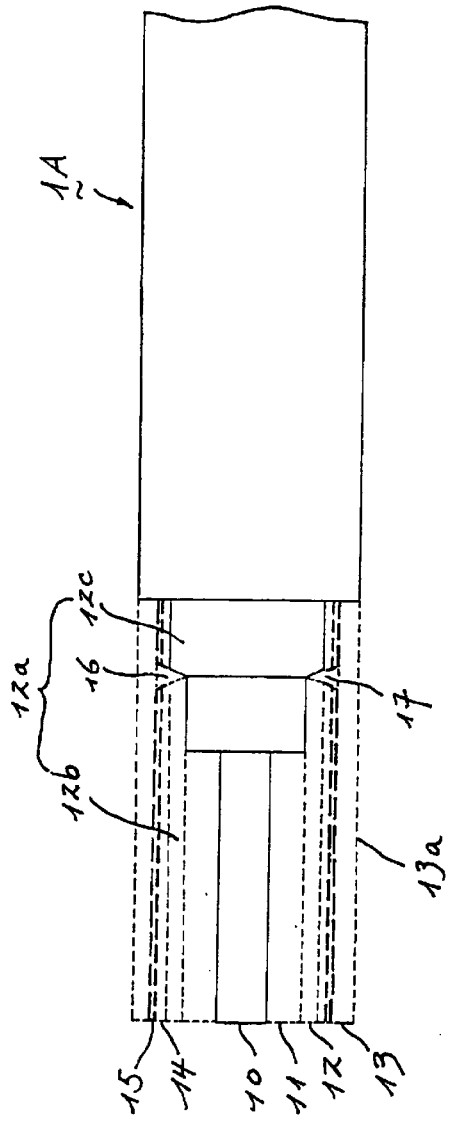
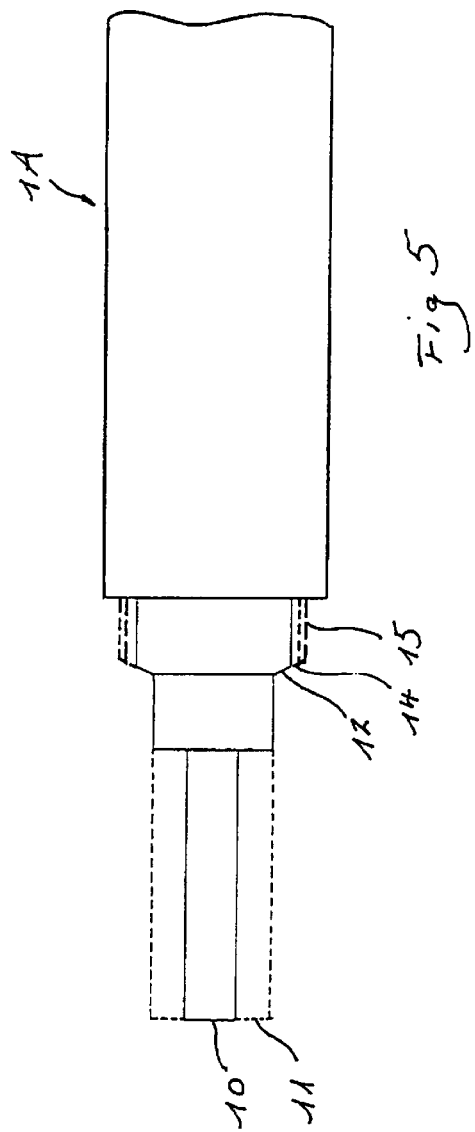

METHOD FOR REMOVING A BRAIDING LAYER OF COAXIAL CABLE

CROSS-REFERENCE TO RELATED APPLICATION

This application is a continuation of the application Ser. No. 09/454,538 filed Dec. 6, 1999, now U.S. Pat. No. 6,477,767, and relates to the application Ser. No. 09/455,593 filed Dec. 6, 1999, now abandoned.

FIELD OF THE INVENTION

The present invention relates to a method, and particularly to a method for removing a braiding layer of a coaxial cable.

DESCRIPTION OF THE PRIOR ART

Signal transmission with a signal line is very keen to the performance of a computer. When the signal transmission speed becomes faster and faster, EMI shielding becomes more and more important to prevent cross talk between two adjacent signal lines. For example, the conventional flat flexible cable (FFC) is configured with a plurality of conductive wires which are connected side-by-side. In order to prevent the cross talk between two adjacent conductive wires, every two conductive wires are spaced by a ground conductive wire.

For a 68-position FFC, generally there are 34-position signal conductive wires and 34-position ground conductive wires which are alternatively arranged between two adjacent signal conductive wires. This arrangement of course solves the cross-talk interference between two adjacent signal conductive wires. However, the signal transmission capacity of the FFC is largely comprised by that 34-position ground conductive wires. As a result, how to increase the signal transmission capacity in a cable without increasing the conductive wires of the cable becomes an eminent issue.

The introduction of a micro-coaxial cable which is configured by a plurality of individual micro-coaxial wires solves this issue. Each individual micro-coaxial wire generally comprises, 1) a core conductor; 2) a layer of insulator coated over the core conductor and made from Teflon; 3) a layer of braiding layer encapsulated the insulator; and 4) an outer insulator made from plastic material. Because each core conductor is encapsulated by a metal braiding, cross talk between two adjacent core conductors of two individual micro-coaxial wires can be effectively solved. For example, if the FFC is replaced by the micro-coaxial wires, without increasing the number of the wires, the signal transmission capacity is doubled by using the micro-coaxial wires.

However, termination between the micro-coaxial wires and associated terminals of connector becomes complicated as compared with the conventional FFC and its associated connector. Convention, conductors of the FFC cable are terminated to insulation displacement sections of terminals of the associated connector. The insulation displacement sections may easily pierce the insulation layer of the conductive wire and make a connection. But the micro-coaxial wire can not be terminated to the connection with the same method because the insulation displacement section will be terminated to both the metal braiding as well as the core conductors when it pierce the outer and inner insulation layers. By the limitation of its connections, the application of the micro-coaxial wires are limited even it has excellent electrical property.

In addition, before the micro-coaxial can be terminated to a connector, it must be undergone certain machining processes, i.e. 1) stripping the outer layer to expose a certain length of the braiding; 2) removing a section of the braiding while leaving a short length thereon; 3) removing a certain length of inner insulator to expose the core conductor.

U.S. Pat. No. 5,199,885 discloses a certain type of connector (tradename: MICTOR, manufactured by AMP Incorporated) which can be used with a micro-coaxial cable. The Mictor connector contains two rows of signal contacts and a grounding bus is disposed therebetween. The tails of the terminals are arranged in a straddle type arrangement and the grounding bus has grounding legs extending between the tails. However, the micro-coaxial wires still can not assembled to the terminals of the Mictor connector. In assembling the micro-coaxial wires to the Mictor connector, a transition printed circuit board is utilized. The printed circuit board is formed with conductive traces on top and bottom surfaces for connections with the straddle arranged tails. The printed circuit board is further formed with at least a ground plane to be connected with the grounding legs of the grounding bus of the Mictor connector, as disclosed in the '885 patent. In addition, the top and bottom surfaces are also formed with grounding pads which are interconnected with the grounding plane within the printed circuit board. As discussed before, before the micro-coaxial can be soldered to the printed circuit board, the micro-coaxial wires shall be machined for further processing. After the micro-coaxial wires are processed, the micro-coaxial wires can be attached to the printed circuit board one by one. In some application, the Mictor connector is used with 152-position micro-coaxial wires which are extremely laborious.

As described above, the braiding layer of the co-axial wire shall be removed before the co-axial can be attached to the printed circuit board. As the braiding layer is configured by a plurality of tiny wires, it can be hardly cut without damage the inner insulator. An existing method is to use the compressed air to blow the tiny wires apart from the insulator, and then trim it. This is extremely laborious.

SUMMARY OF THE INVENTION

An objective of the present invention is to provide a method wherein a braiding layer of a micro-axial wire can be efficiently removed.

In order to achieve the objective set forth, a method in accordance with the present invention for removing a braiding layer of a coaxial cable which includes a core conductor; a layer of insulator coated over the core conductor; a layer of braiding layer encapsulated the insulator; and 4) an outer insulator, comprises the steps of a) removing a section of the outer insulator to expose a section of the braiding layer; b) dipping the section of the braiding layer into a solder bath such that the braiding layer is coated with a layer of solder to form a consolidated section; c) scoring a cut along traverse section of the consolidated section and dividing the consolidated section into first and second portions; d) bending the consolidated section along the cut to break the first and second portions; and e) removing the first portion and exposing the inner insulator.

BRIEF DESCRIPTION OF THE DRAWINGS

FIG. 1 is an end view a micro-coaxial cable configured by a plurality of coaxial wires bonded by plastic membranes;

FIG. 4 is a side elevational view of FIG. 3;

FIG. 5 is a side elevational view with the braiding layer removed;

FIG. 6 is an end view of FIG. 3; and

DETAILED DESCRIPTION OF PREFERRED EMBODIMENT

Figure 3:
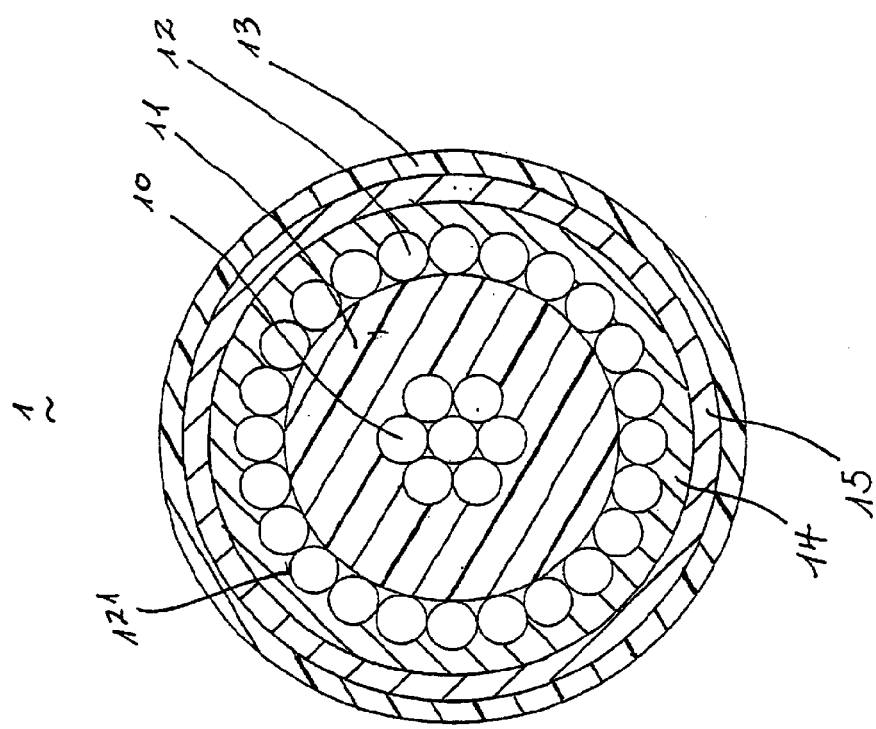
FIG. 3 is a cross sectional view showing a braiding layer of the micro-coaxial wire is coated with first and second solder layers.
Figure 2:
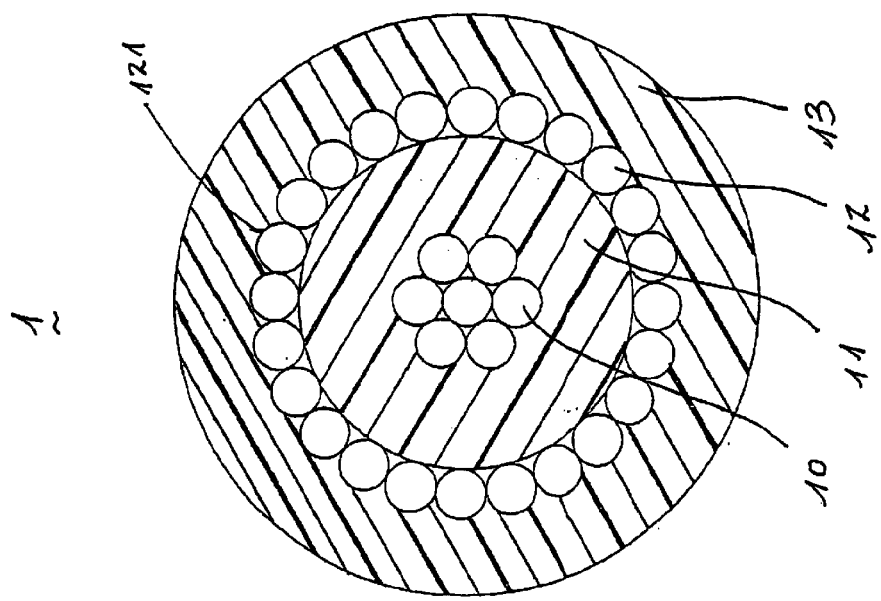
FIG. 2 is a cross sectional view of a single micro-coaxial wire used in FIG. 1.
Figure 7:
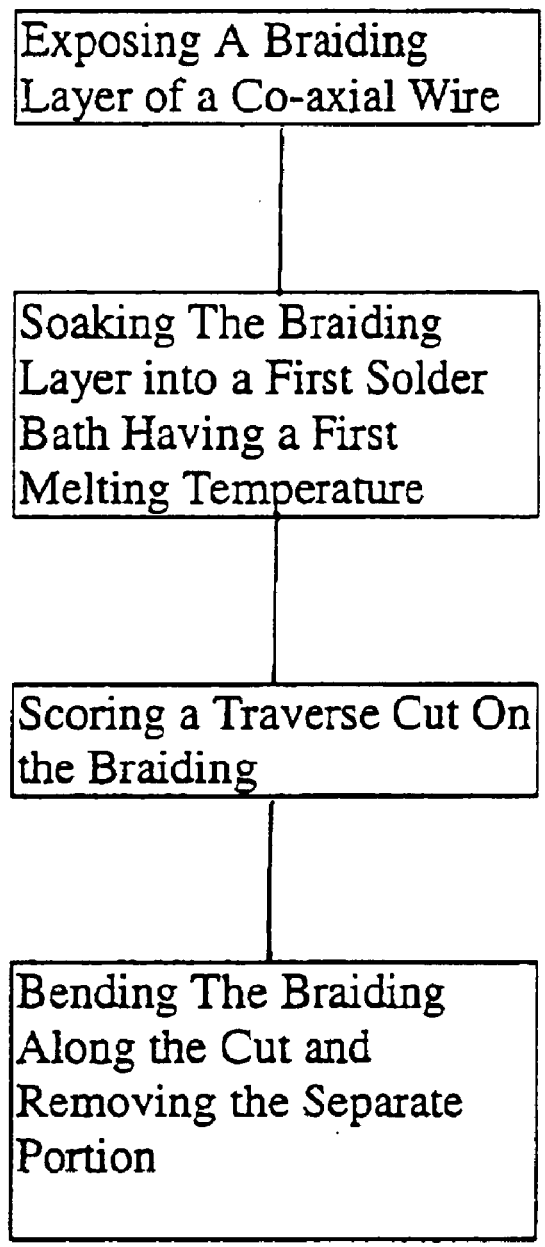
FIG. 7 is a flow chart of the present invention.

Referring to FIGS. 1 and 2, a micro-coaxial cable 1A configured by four micro-coaxial wires 1 are shown. The number of the micro-coaxial wires 1 can be increased according to the actual requirement, for example, 42 positions, or even 152 positions. The micro-coaxial wires 1 are bonded together by two membranes 1B. The micro-coaxial wire 1 in accordance with the present invention generally comprises a core conductor 10, a layer of insulator 11 coated over the core conductor 10. The insulator 11 can be selected from a variety of insulation materials, such as Teflon. A layer of braiding 12 is encapsulated over the insulator 11 to provide EMI shield over the core conductor 11. The braiding layer 12 is configured by a plurality of strands 121 which is coiled along the insulator 11. By this arrangement, the braiding 12 provides excellent EMI shield effect over the core conductor 10. In addition, the braiding 12 also have excellent flexibility. A jacket 13 is coated over the braiding 12 to provide the wire with excellent aesthetic appearance. Because each core conductor 10 is encapsulated by a metal braiding 12, cross-talk between two adjacent core conductors 10 of two individual micro-coaxial wires 1 can be effectively solved.

According to the present invention, when a section 13a of jacket 13 is stripped from the wire 1 and a segment 12a of braiding layer 12 is exposed. The segment 12a is dipped into a molten solder bath (not shown) such that a solder layer 14 is coated over the segment 12a and the braiding layer 12 is consolidated and thickened. In addition, by the effect of siphon, interstitial space between the strands 121 are all soaked and filled with the solder 14 leaving no interstitial space therebetween. When the molten solder 14 is cooled and cured, the segment 12a is no longer flexible instead becoming rigid because of the first solder layer 14.

After the segment 12a is soaked and coated with the first solder 14, the segment 12a is further coated with a second solder 15. According to the preferred embodiment, the melting point of the second solder 15 is lower than the melting point of the first solder 14.

In addition, after the braiding 12 is undergoing dipping processes, every two adjacent braidings 12 are also connected by the solder layers 14 and 15. This further increases the rigidity of the braiding 12 and make it easy be broken apart by the process described below.

After the braiding segment 12a is coated with the second solder layer 15, the braiding segment 12a is undergone a scoring process such that a cut 16 is formed on the consolidated segment 12a, FIG. 4. During the scoring process, only the first and second solder layers 14 and 15, and the braiding layer 12 is scored, while the insulator 11 is left intact. After the cut 16 is formed on the consolidated segment 12a, a second cut 17 opposite the first cut 16 is formed on the bottom of the consolidated segment 12a. With the first and second cuts 16, 17 the consolidated segment 12a is divided into first and second portions 12b and 12c. Then the first portion 12b is bent along the cuts 16, 17 such that the first portion 12b is completely separated from the second portion 12c. Afterward, the first portion 12b is removed from the wire 1 and exposes the insulator 11, see FIG. 5. After the segment 12b is removed from the co-axial wire 1, a section 11a of the insulator 111 is going to be removed and finally the core conductor 10 is completely exposed.

With the process described above, the braiding 12 of a micro-coaxial cable 1A can be easily removed without damaging the insulator 11 and the core conductor 10. Accordingly, mass production of making a micro-coaxial cable is feasible.

What is claimed is:

1. An electrical cable assembly comprising:

a coaxial wire including:

a core conductor coaxially enclosed by an inner insulator with a portion of the core conductor being exposed;

a relatively flexible braiding layer coaxially encapsulating said inner insulator with a portion of said inner insulator and said portion of the core conductor being exposed; and an outer insulator coaxially encompassing said braiding layer with a portion of said braiding layer uncovered; wherein an inner solder layer is coaxially circumferentially coated upon said portion of the braiding layer to provide the braiding layer with rigidity for breaking consideration, and an outer solder layer is coaxially circumferentially coated upon said inner solder layer, under a condition that a melting point of the outer solder layer is lower than that of the inner solder layer.

* * * * *